Figure 3:
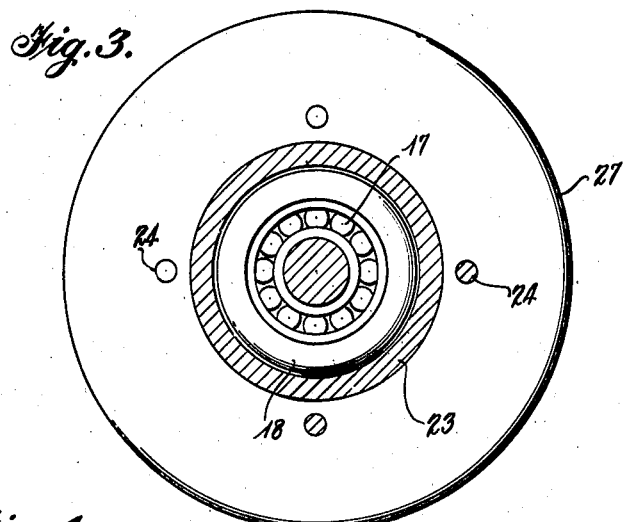

Aug. 15, 1939    C. R. WEISS ET AL    2,169,624
BELT CONVEYER IDLER
Filed March 12, 1938    3 Sheets-Sheet 1
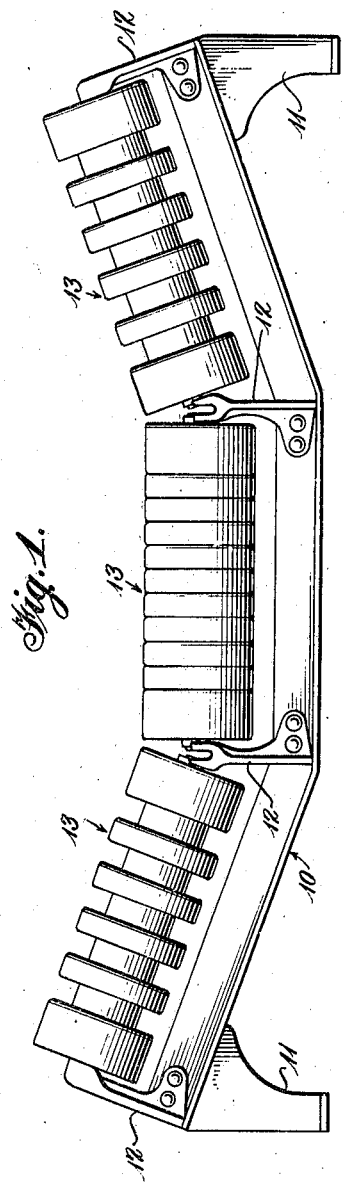
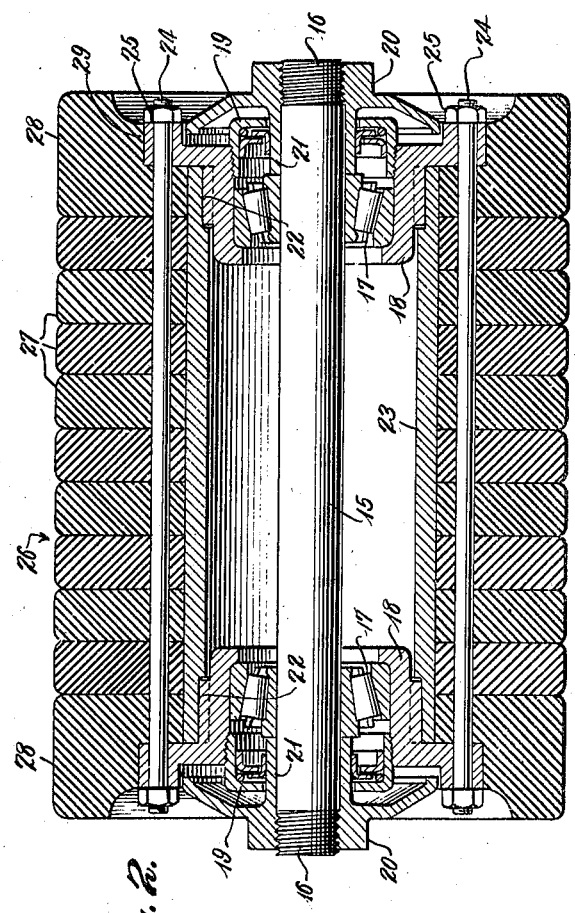
Inventors
Charles R. Weiss and
Richard W. Parker
By L. Donald Myers
Attorney Aug. 15, 1939 C. R. WEISS ET AL 2,169,624
BELT CONVEYER IDLER
Filed March 12, 1938  3 Sheets-Sheet 2

Inventors
Charles R. Weiss and
Richard W. Parker
By L. Donald Myers
Attorney

Aug. 15, 1939.  C. R. WEISS ET AL  2,169,624
BELT CONVEYER IDLER
Filed March 12, 1938  3 Sheets-Sheet 3
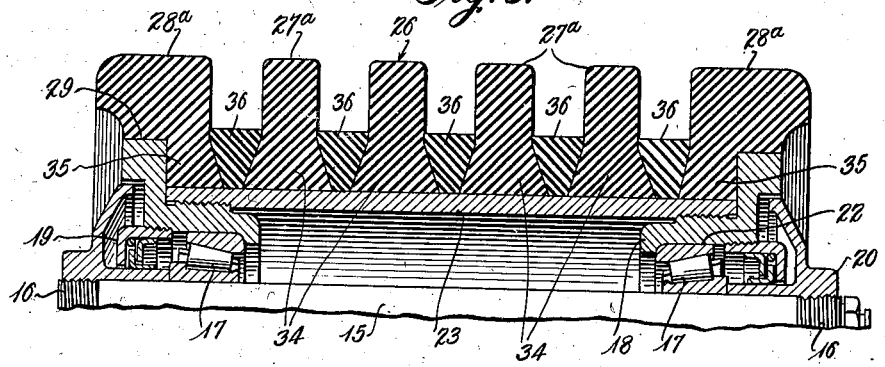
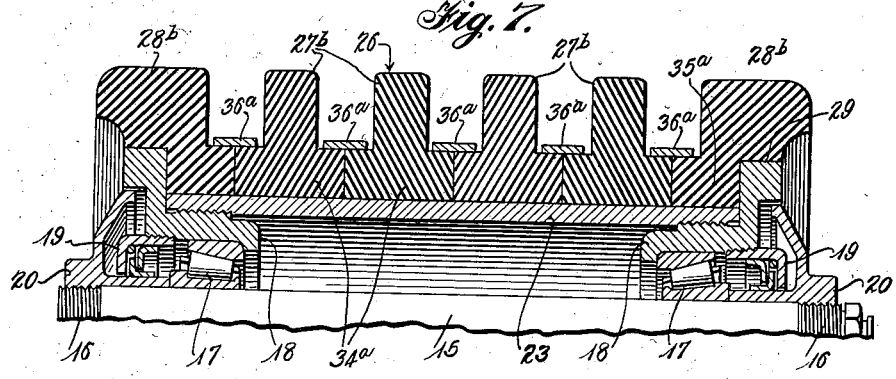
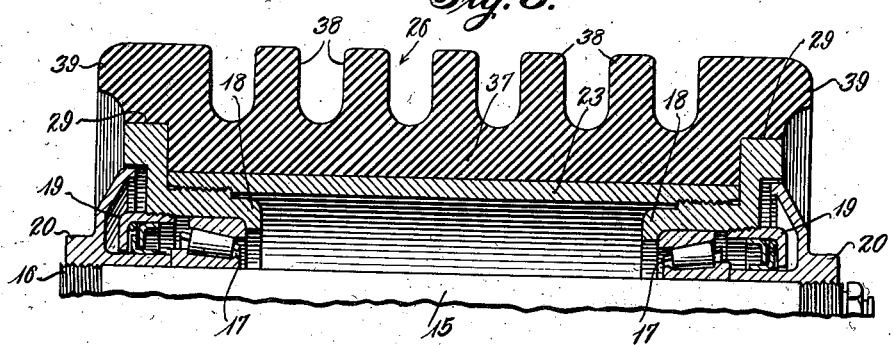
Inventors
Charles R. Weiss and
Richard W. Parker
By L. Donald Myers
Attorney Patented Aug. 15, 1939

2,169,624

UNITED STATES PATENT OFFICE 2,169,624

BELT CONVEYER IDLER

Charles R. Weiss and Richard W. Parker, Indianapolis, Ind., assignors to Link Belt Company, a corporation of Illinois Application March 12, 1938, Serial No. 195,605

12 Claims. (Cl. 198—192)

This invention relates to new and useful improvements in idlers for belt conveyers.

The idlers most commonly used for supporting the endless belts of conveyers have metal rolls which directly engage both surfaces of the belt; one surface in supporting the active run and the other surface in supporting the inactive run. It is impossible to prevent at least some of the material being conveyed from spilling onto or otherwise coming into contact with the metal rolls if the material being handled is in lump, granular or powdered form. The material often is of such a character that it will cause abrasion or corrosion of the metal rolls.

It is the usual practice to feed the material to be conveyed onto the belt by gravity. When the material is heavy and/or possesses sharp corners or points, the metal rolls underneath the belt afford such a rigid, non-yielding support that the belt is constantly being subjected to impact blows delivered by the heavy or sharp cornered materials which are in no way absorbed or lessened in intensity. The belt, therefore, is subjected to considerable punishment as it passes beneath the mechanism employed for feeding the material to the conveyer.

If the material being conveyed is weighty, it will cause the belt to sag between idlers with the result that the material will be jarred or jolted as it passes over the metal rolls of each idler.

It is the primary purpose of this invention to provide rolls for the idlers of belt conveyers which will resist the abrasive and corrosive actions of the material being transported.

A further important object of the invention is to provide idler rolls which will absorb shocks delivered to the belt while passing the loading mechanism and which will yield to the passage of material thereover so as to permit the material to move smoothly through its entire travel.

A further important object of the invention is to provide idler rolls which may be fabricated from a few different standardized parts in such a manner that a full line of different sized idlers may be rapidly produced therefrom and made readily available for prompt shipment without having to carry in stock a full line of pre-fabricated rolls of the various standard sizes.

A still further object of the invention is to provide idlers which are designed for minimum weight and maximum resiliency and with the parts which are most frequently and continuously subjected to wear and abuse being quickly and easily replaced without making it necessary to discard practically the entire structure.

Another object of the invention is to provide idler rolls which have their belt contacting surfaces formed by a plurality of separately compressible sections or portions which are held in position in a manner to leave the peripheral regions of the sections or portions free to be compressed or deformed with the result that the roll affords a maximum amount of elasticity.

Other objects and advantages of the invention will be apparent during the course of the following description.

Figure 4:
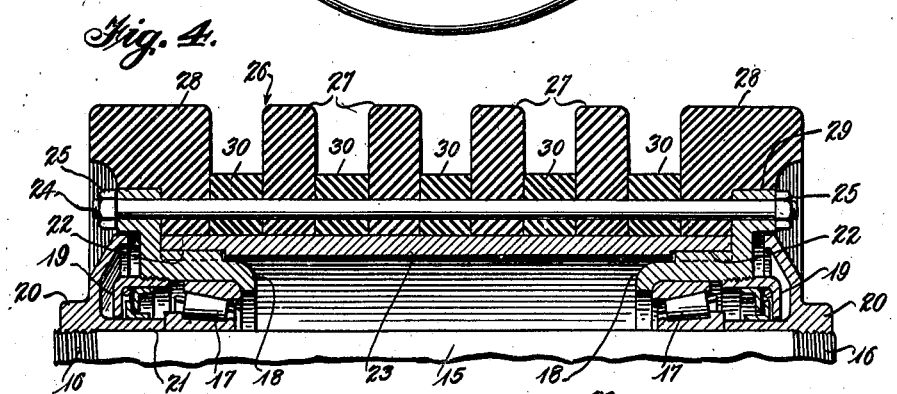
Figure 5:
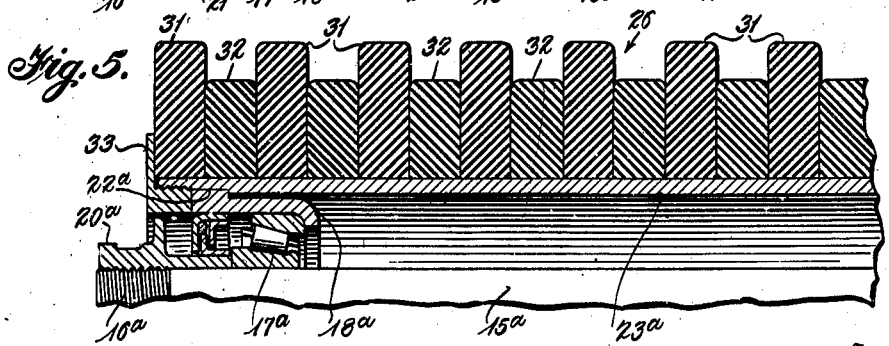

In the accompanying drawings forming a part of this specification and in which like numerals are employed to designate like parts throughout the same, Figure 1 is an elevational view of a complete idler structure embodying this invention, Figure 2 is a longitudinal sectional view illustrating one form of idler roll which is constructed in accordance with the principles of this invention, Figure 3 is a transverse sectional view of the roll structure disclosed in Fig. 2, Figure 4 is a fragmentary longitudinal sectional view illustrating a modified form of idler roll structure, Figure 5 is a fragmentary longitudinal sectional view illustrating a further modified form of idler roll structure, Figure 6 is a fragmentary longitudinal sectional view of a still further modified form of idler roll structure, Figure 7 is a similar view to Fig. 6, but illustrates another form of idler roll structure, and Figure 8 is a similar view to Figs. 6 and 7, and illustrates another form of idler roll structure.

In the drawings, wherein for the purpose of illustration are shown the preferred embodiments of this invention, Figure 1 discloses an idler structure of the type which is intended for troughing the active run of a conveyer belt. This idler includes a main frame 10 which is supported by legs 11 at its opposite ends. A suitable number of bracket arms 12 are carried by the frame 10 and function to support the shafts of the several idler rolls 13. It is to be understood that these rolls 13 may be constructed in the manner disclosed in each one of the remaining figures of the drawings. In Fig. 1, the rolls 13 are illustrated as being angularly arranged to effect troughing of a conveyer belt. It is to be understood, however, that rolls of the character disclosed in the remaining figures of the drawings may be constructed of proper lengths to employ a single roll for supporting the entire width of the conveyer belt.

The first form of idler roll to be described is illustrated in detail in Figs. 2 and 3. This roll includes a shaft 15 which is threaded at its opposite ends as at 16. An anti-friction or other type of bearing unit 17 is mounted on each end portion of the shaft. Supported on the shaft by the bearing units 17 are the head members 18. For the purpose of excluding dust and other foreign matter from the bearings 17 and to retain lubricants for said bearings, a lubricant retaining seal 19 is threadedly connected to each one of the heads 18. It will be seen that the said heads retain the bearing units 17 from movement toward each other. A retaining nut 20 is threaded on each end portion 16 of the shaft 15 and is provided with a sleeve portion 21 which bears against the inner raceway of the adjacent bearing unit to prevent outward movement of the unit.

Each head 18 is provided with an annular shoulder or seat portion 22 on which bears the adjacent end of a tubular shell 23 which encircles the shaft 15 and is retained in concentric relation with respect thereto by the bearing units 17 and the heads 18. A suitable number of tie rods 24, having nuts 25 threaded on the opposite ends of the same, pass through openings formed in the heads 18 to draw these heads toward each other. By means of the tie rods 24 and the shell 23, the heads 18 are retained in proper spaced relation.

For the purpose of causing the roll to absorb shocks and to cause the roll to resist abrasion and corrosion, a tread 26 is applied to the portion of the roll which has been described heretofore. This tread is formed of a plurality of rubber, ringlike sections 27 and 28. All of these sections are placed in direct contact with each other and, as is shown in Fig. 2, all of the sections are of uniform diameter. The various central sections 27 are also of uniform thickness. The end sections 28 are of greater thickness, or of greater dimensions in an axial direction, to afford proper lateral support for the thinner inner sections 27. The end sections 28, also, are recessed centrally, as at 29, to receive the peripheral portion of the adjacent head 18.

It will be appreciated that the various ringlike sections 27 and 28 of the tread portion 26 may be made of any suitable resilient material. It is preferred, however, to form these sections of solid rubber. By disconnecting either of the retaining nuts 20 and the adjacent nuts 25 from the tie rods 24, the head 18 at that end of the roller assembly may be removed with its bearing unit 17 for the purpose of removing any or all of the ring-like sections 27 and 28 to permit repairs to be made. It also will be appreciated that by varying the length of the shaft 15, the shell 23, and the tie rods 24, rolls of different lengths may be provided by merely varying the number of intermediate ring-like sections 27.

Fig. 4 discloses an idler roll structure which differs from the construction disclosed in Figs. 2 and 3 solely by having alternate ring members or sections 30 of the tread of reduced diameter as compared to the ring-like sections 27 and 28. The remaining elements of this roll are the same as have been described in connection with Figs. 2 and 3, and for that reason the same reference characters will be applied thereto. The tread portion 26 of the roll disclosed in Fig. 4 will possess a slightly higher degree of elasticity or flexibility in view of the fact that the ring-like sections 27 and 28 will be permitted to flex or be deformed laterally or in an axial direction with respect to the entire roll assembly.

Fig. 5 discloses a further modified form of idler roll. This roll includes a central shaft 15a which is threaded at its opposite ends 16a. An anti-friction roller unit 17a is mounted on each end of the shaft 15a. These bearing units 17a support head members 18a for rotation relative to the shaft 15a. The bearing units 17a are retained in position upon the shaft 15a by the heads 18a and retaining nuts 20a which are threaded onto the end portions 16a of the shaft. Seated on a shoulder portion 22a of each head 18a is a tubular shell 23a.

Mounted upon the shell 23a is a tread portion 26 which is formed of two sets of ring-like members or sections 31 and 32. The sections 31 are of greater diameter than the sections 32 and for that reason project peripherally beyond the sections 32.

All of these sections 31 and 32 are detachably retained upon the shell 23a by means of a retaining flange 33 which is threaded into each end of the bore of the shell 23a.

In this roll assembly, the peripheral regions of the ring-like sections 31 will be permitted to be flexed laterally or axially of the roller structure and they may be very readily compressed radially.

In the roller structure disclosed in Fig. 6, we have a modification in the tread portion 26 over the roll structure disclosed in Figs. 2 to 4, inclusive. For that reason, the tread portion will be specifically described, but the same reference characters as those applied in Figs. 2 to 4, inclusive, will be employed for the remaining elements. The tread portion 26 of the roll shown in Fig. 6 includes the thick end ring sections 28a and the spaced intermediate ring sections 27a. The base portion 34 of each one of the intermediate rings 27a is of dovetail shape in cross section. The base portion 35 of each one of the end ring members 28a is of semi-dovetail shape in section. These base portions 34 and 35, therefore, are provided with laterally projecting shoulders.

To retain the various ring sections 27a and 28a in proper spaced relation along the length of the shell 23 and to clamp the ring sections against radial outward movement, clamping bands 36 of V-shape in section are positioned between the various ring sections 27a and 28a. These clamping bands 36 engage the laterally projecting shoulders formed by the bases 34 and 35 of the ring sections.

The modified form of idler roll disclosed in Fig. 7 differs from the roll structures disclosed in Figs. 2 to 4, inclusive, and 6 solely with reference to the type of tread 26 which is associated with the remainder of the assembly. All other elements of the roll assembly are the same as those disclosed in the preceding figures, and for that reason the same reference characters will be applied thereto.

The tread portion 26 of the structure shown in Fig. 7 includes a plurality of intermediate ring sections 27b which are of inverted T-shape in cross section. This sectional shape of the ring members 27b provides base portions 34a which are axially enlarged with respect to the remaining portion of the ring so as to provide laterally projecting shoulders. The end ring members 28b also are provided with base portions 35a which are enlarged to provide laterally projecting shoulders. These various base portions 34a and 35a are placed in engagement with each other to maintain the peripheral portions of the several rings spaced in an axial direction. To retain the various ring members 27b and 28b against radial movement away from the shell 23, a clamping band 36a is positioned between each adjacent pair of ring members and clamps the base members 34a and 35a to the shell 23.

The form of idler roll disclosed in Fig. 8 differs from the rolls disclosed in Figs. 6 and 7 only with reference to its tread portion 26. This tread portion 26 is molded in one piece and includes a continuous base 37 with the ring-like ribs 38 formed in axial spaced relation around the periphery of the base. The end portions of the base 37 have formed thereon the heavier or thicker ring-like portions 39. The remaining elements of this roller structure will be identified with the same reference characters as have been used in Figs. 6 and 7.

It will be appreciated that with the tread portions of each one of the several roll structures formed of rubber, or other similar elastic material, the rolls will be capable of resisting the abrasive and corrosive actions of the material being transported by the conveyer belt supported by such rolls. These rolls, also, will be able to absorb and resist shocks or impacts delivered to the belt either by the material being dropped by gravity thereon or from any other cause. The rolls also will yield to the passage of material and objects thereover with the result that the material or objects will be permitted to move smoothly throughout the entire active or load-carrying run of the conveyer.

Because of the fabricated nature of the roll constructions, it will be possible to produce rolls of any desired lengths or diameters by employing elements of proper size. It will be possible, therefore, to maintain in stock a few different standardized parts and produce therefrom a full line of idler rolls without having to carry in stock a full line of prefabricated rolls of the different standard sizes. It also will be possible to very readily and quickly replace worn-out or damaged elements without having to discard an entire roll assembly.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, we claim:

1. In a belt conveyer idler, a roll comprising a shell, a resilient laminated tread for the roll comprising a plurality of ring members of alternatingly different diameters mounted on the shell, said larger diametered ring members being separately compressible at the peripheral region of the roll and affording a belt supporting surface which is equal to at least one half the length of the roll, said smaller diametered ring members being formed of rubber, or the like, and means located radially inwardly of said peripheral region of the roll for restraining said ring members against radial outward movement.

2. A belt conveyer idler comprising a frame, a plurality of bracket arms carried by the frame, and angularly arranged rolls mounted on said bracket arms, each one of said rolls comprising a shell, and a rubber tread mounted on said shell and held against removal by said heads, the rubber tread for each end roll including a peripheral region formed of a plurality of axially separated portions with means adjacent said shell for maintaining said portions separated, the rubber tread for the middle roll being of uniform diameter throughout its length.

3. In a belt conveyer idler, a roll comprising a shell, a rubber tread mounted on said shell and being divided into a plurality of ring-like sections, with the section at each end of the roll being of greater dimension in an axial direction than the remaining sections, and means for retaining all of said ring-like sections in place on said shell.

4. In a belt conveyer idler, a roll comprising a shell, a rubber tread mounted on said shell and being divided into a plurality of ring-like sections of alternately different diameters, and a plurality of tie rods extending axially of the roll through said sections of the tread to secure the sections in place.

5. In a belt conveyer idler, a roll comprising a shell, a rubber tread mounted on said shell and being divided into a plurality of ring-like sections with adjacent sections being of different diameters, and a head at each end of the shell for retaining said sections in place.

6. In a belt conveyer idler, a roll comprising a shell, and a rubber tread mounted on said shell and being formed by a plurality of ring-like sections with each section having an axially enlarged base region forming laterally projecting shoulders and a plurality of additional ring-like sections of less diameter than and engaging the shoulders of adjacent pairs of said first sections.

7. In a belt conveyer idler, a roll comprising a pair of heads each having a seat located inwardly of its periphery, a shell bearing at its ends on said heads, and a tread of solid rubber mounted on said shell, said tread being formed of ring-like sections with the end sections being of greater mass than the intermediate sections and being recessed to receive the portions of the heads located outwardly of their shell seats.

8. In a belt conveyer idler, a roll comprising a laminated solid rubber tread with adjacent laminations being of different diameters.

9. In a belt conveyer idler, a roll comprising a laminated solid rubber tread, each of said tread laminations being axially enlarged adjacent its base to maintain the peripheral portions spaced, and means engageable with said enlargements to restrain said laminations against radial outward movement.

10. In a belt conveyer idler, a roll comprising a laminated solid rubber tread, each of said tread laminations being axially enlarged adjacent its base to maintain the peripheral portions spaced, and clamping bands engageable with said enlargements to restrain said laminations against radial outward movement.

11. In a belt conveyer idler, a roll comprising a laminated solid rubber tread, and annular bands encircling at least a part of each lamination for restraining said laminations against radial outward movement.

12. In a belt conveyer idler, a roll comprising a shell, and a rubber tread mounted on said shell and being divided into a plurality of ring-like sections with the section at each end of the roll being of greater dimension in an axial direction than the remaining sections.

CHARLES R. WEISS.
RICHARD W. PARKER.